C. H. DOUGLAS.
MACHINE FOR RIBBING THE TEETH OF SAWS.
APPLICATION FILED OCT. 6, 1913.

1,107,500.

Patented Aug. 18, 1914.
3 SHEETS—SHEET 1.

WITNESSES:
David B. Miller
Samuel McWhorter

INVENTOR.
Charles H. Douglas

C. H. DOUGLAS.
MACHINE FOR RIBBING THE TEETH OF SAWS.
APPLICATION FILED OCT. 6, 1913.

1,107,500.

Patented Aug. 18, 1914.

3 SHEETS—SHEET 3.

WITNESSES:
David B. Miller
Samuel McWhorter

INVENTOR.
Charles H. Douglas

UNITED STATES PATENT OFFICE.

CHARLES H. DOUGLAS, OF SPRINGFIELD, MASSACHUSETTS, ASSIGNOR TO DOUGLAS SAW & MACHINERY CO., OF BOSTON, MASSACHUSETTS.

MACHINE FOR RIBBING THE TEETH OF SAWS.

1,107,500.  Specification of Letters Patent.  Patented Aug. 18, 1914.

Application filed October 6, 1913. Serial No. 793,592.

*To all whom it may concern:*

Be it known that I, CHARLES H. DOUGLAS, a citizen of the United States, and a resident of Springfield, in the county of Hampden and State of Massachusetts, have invented a new and useful Machine for Ribbing the Teeth of Saws, of which the following is a specification.

My invention relates to a machine for raising ribs on the sides of the teeth of tempered saws; and the object of said invention is to provide a method of producing ribs on the alternate sides of the form of teeth shown and described in my patent on saws, No. 1,033,996, dated July 30, 1912. I attain this object by the mechanism illustrated in the accompanying drawings in which—

Figure 1:
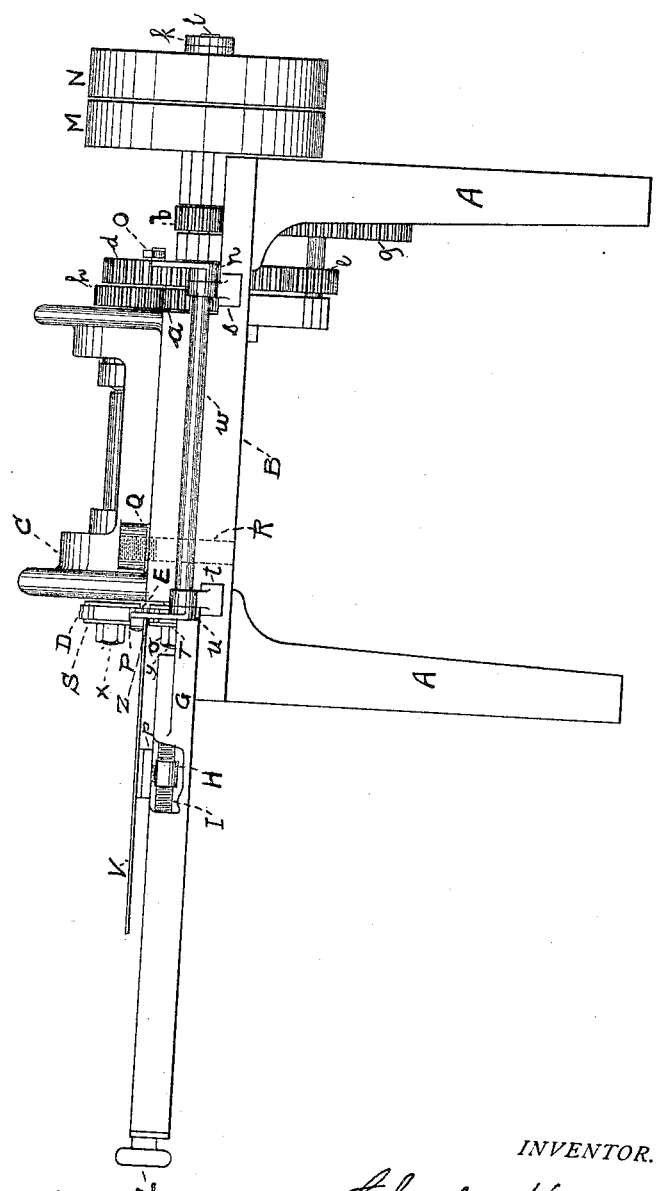
Figure 2:
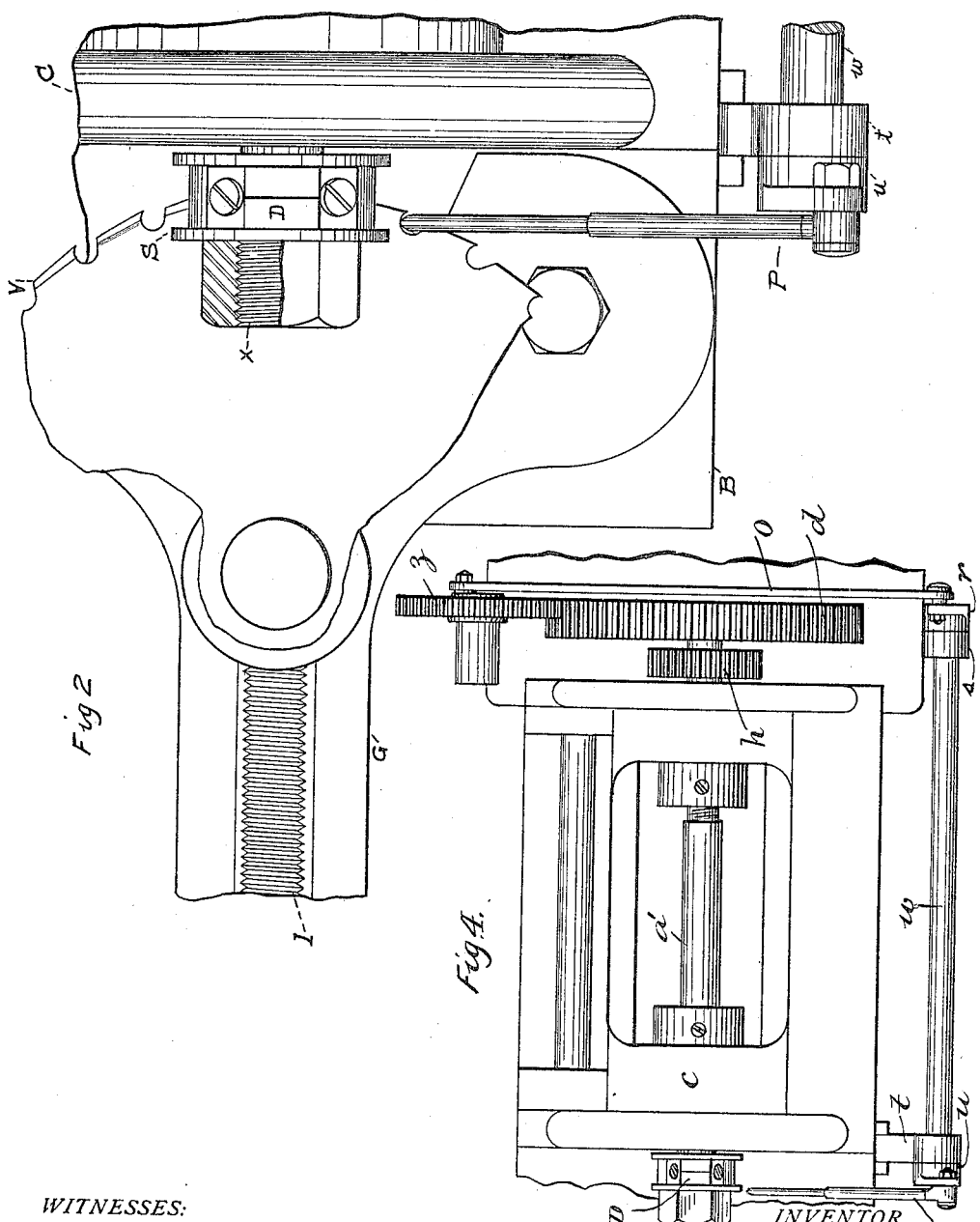
Figure 3:
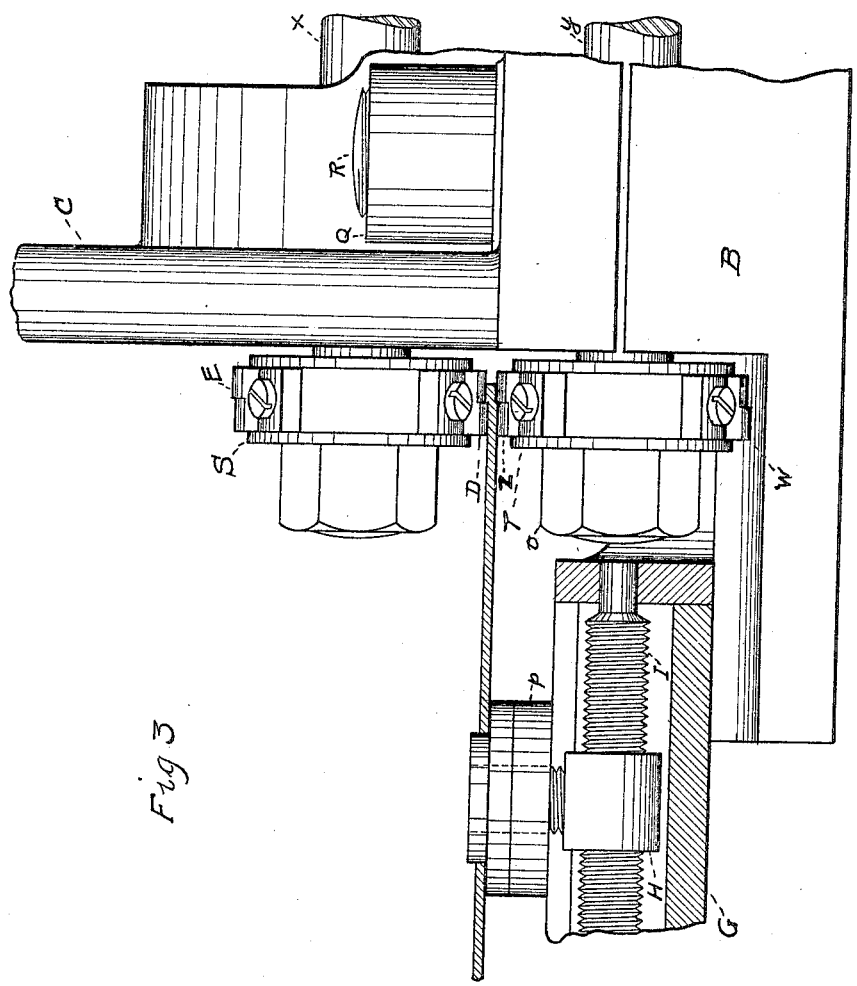

Figure 1, is a front elevation of the machine. Fig. 2 is a plan view of a portion of the machine, showing one of the rolls upon which a ribbing die is attached, and part of a circular saw on which some of the said ribs have been raised. Fig. 3 is a portion of the front end of the machine, showing the rolls on which the ribbing dies are secured and a section of saw-blade between the dies that force out the rib. Fig. 4 is a plan view of a portion of the machine.

Similar letters refer to similar parts throughout the several views.

The legs A, bed B, cap C, and arms G, constitute the frame work of the machine. The shaft $x$ is attached to the cap C by boxes in which it is made to revolve by a small gear $h$ at one end, and at the other end there is secured a round grooved head S, upon which two ribbing dies D and E are secured. On the base B there is another shaft $y$, which is made to revolve in unison with shaft $x$ by the small gear $a$, which interlocks with gear $h$, of the same size. On the other end of shaft $y$ there is another grooved head T directly under the head S, upon which the dies Z and W are secured. These ribbing dies on both heads are curved, and are made with a slight offset on one side, and are so placed that when the heads are caused to revolve, the prominent part of the dies on one head revolves directly opposite the recess in the die of the opposite head and by this means a rib is raised on the outer circumference of the tooth on the saw blade V Fig. 3. When the heads have been revolved to bring the dies E and W opposite, the rib on the following tooth is forced down, the offset on the ribbing dies being reversed. By this device, a rib is rolled up on one tooth and rolled down on the tooth following.

The plunger P is operated by the rockshaft crank $u$ attached to the rock-shaft $w$, and serves to push each tooth of the sawblade V to its proper position at the proper time for the ribbing dies to act upon it. The power to drive the ribbing die heads S and T and the plunger P, is conveyed through the belt pulleys M and N Fig. 1, to the pinion $b$ which meshes into and drives gear $g$ on the shaft $m$ on which there is a pinion $e$ which drives gear $d$ on shaft $y$. The plunger P is pressed forward twice at each revolution of the die heads by a connecting rod $o$ which extends from crank $r$ on rock shaft $w$, back to a crank pin on gear $z$ half the size of gear $d$ by which it is driven, the crank pin being secured to the small gear at the proper distance from its center to move the connecting rod through which it passes, the required distance to force a saw tooth forward to be acted upon by the ribbing dies.

In arm G there is a screw I which moves the nut H, to which the center plate $p$ is attached, the proper distance from the ribbing dies to take in the different sizes of saw blades that require to be ribbed. The cap C is hinged to the bed on the back of the machine, and in the front of the bed there is secured a heavy bolt R which passes loosely through the front edge of the cap, and a powerful nut Q screwed upon the upper end of said bolt is used to bring the head down for the purpose of adjusting the ribbing heads and dies the required distance apart for ribbing the saw teeth.

$a'$ is a shaft in the cap C to which the upper ribbing head S is attached.

$s\ t$ Fig. 1, are the brackets which hold the rockshaft $w$.

L Fig. 1, is a knob or handle by which the adjusting screw I is revolved.

$a$ is a gear wheel secured to the shaft $y$, which meshes into gear $h$ of the same size by which means both shafts are caused to revolve at the same speed.

*l* is the shaft to which the driving pulleys M N are attached and *k* is a collar on the end of the shaft.

*o* is a nut which secures the under die head T.

What I claim as my invention and desire to secure by Letters Patent, is—

In a machine for making ribs on the teeth of tempered steel saws, the combination with a main frame, of two shafts mounted thereon, upon each of which there is secured a round die head, on the peripheries of which are secured on opposite sides of each head, two dies which are made on a curve corresponding with the curve of the heads, and made with offsets on reverse sides, mechanism to cause the dies on the opposite heads to revolve in conjunction with each other at the proper distance apart to receive between them the tooth of a saw and force a rib out on its side, and mechanism to move the next tooth forward to be acted upon by the reverse dies on the opposite sides of the two heads, and thereby to force a rib out on the opposite side of the following saw tooth, substantially as herein specified.

Signed at Springfield, in the county of Hampden, and State of Massachusetts, this 4th day of October, A. D. 1913.

CHARLES H. DOUGLAS.

Witnesses:
SAMUEL MCWHORTER,
WAYLAND V. JAMES.

---

Copies of this patent may be obtained for five cents each, by addressing the "Commissioner of Patents, Washington, D. C."